United States Patent
Martin et al.

(10) Patent No.: US 7,799,159 B2
(45) Date of Patent: Sep. 21, 2010

(54) DEVICE FOR MANUFACTURING A REINFORCEMENT FOR TIRES

(75) Inventors: Pascal Martin, Corent (FR); Christian Bernard, Pont-du-Chateau (FR)

(73) Assignee: Michelin-Recherche et Technique S.A., Granges-Paccot (CH)

( * ) Notice: Subject to any disclaimer, the term of this patent is extended or adjusted under 35 U.S.C. 154(b) by 1011 days.

(21) Appl. No.: 10/587,182

(22) PCT Filed: Jan. 21, 2005

(86) PCT No.: PCT/EP2005/000583

§ 371 (c)(1), (2), (4) Date: Jul. 25, 2006

(87) PCT Pub. No.: WO2005/075180

PCT Pub. Date: Aug. 18, 2005

(65) Prior Publication Data

US 2007/0163698 A1 Jul. 19, 2007

(30) Foreign Application Priority Data

Jan. 27, 2004 (FR) .................................. 04 00809

(51) Int. Cl.
*B29D 30/16* (2006.01)
*B29C 70/32* (2006.01)
(52) U.S. Cl. .................. 156/117; 156/133; 156/397
(58) Field of Classification Search .............. 156/117, 156/133, 177, 397
See application file for complete search history.

(56) References Cited

U.S. PATENT DOCUMENTS

| 3,674,584 | A | * | 7/1972 | Klein | ........................ 156/173 |
| 3,894,906 | A | | 7/1975 | Pearce et al. | |
| 4,952,259 | A | | 8/1990 | Debroche et al. | |
| 5,281,289 | A | | 1/1994 | Debroche et al. | |
| 5,395,476 | A | * | 3/1995 | Debroche et al. | ............ 156/397 |
| 2002/0003020 | A1 | * | 1/2002 | Debroche | ................... 156/121 |

* cited by examiner

*Primary Examiner*—Geoffrey L Knable
(74) *Attorney, Agent, or Firm*—Buchanan Ingersoll & Rooney PC

(57) ABSTRACT

The manufacturing device comprises a rotary distributor 6 in rotation about a rotation axis R, the rotary distributor comprising at least one elbowed tube 61, the elbowed tube having a corridor for receiving the wire on the radially internal side and forming output guidance on the externally radial side. The device comprises a member for conveying to the distributor comprising a tubular portion 53 substantially perpendicular to the rotation axis R, a space in the radial direction being provided between the tubular portion 53 and the elbowed tube 61. A knife 7 is disposed in the space between the rotary distributor and the conveying member. The conveying member and the distributor are coupled and both rotary, the knife 7 being mounted on a knife holder 70 for purposes of adjustment and whose rotation is locked during cutting. The rotary distributor comprises a central tube 51, and inlet orifice 52 of which is disposed substantially on the rotation axis R of the rotary distributor, the tubular portion 53 coming in line with the central tube 51.

19 Claims, 5 Drawing Sheets

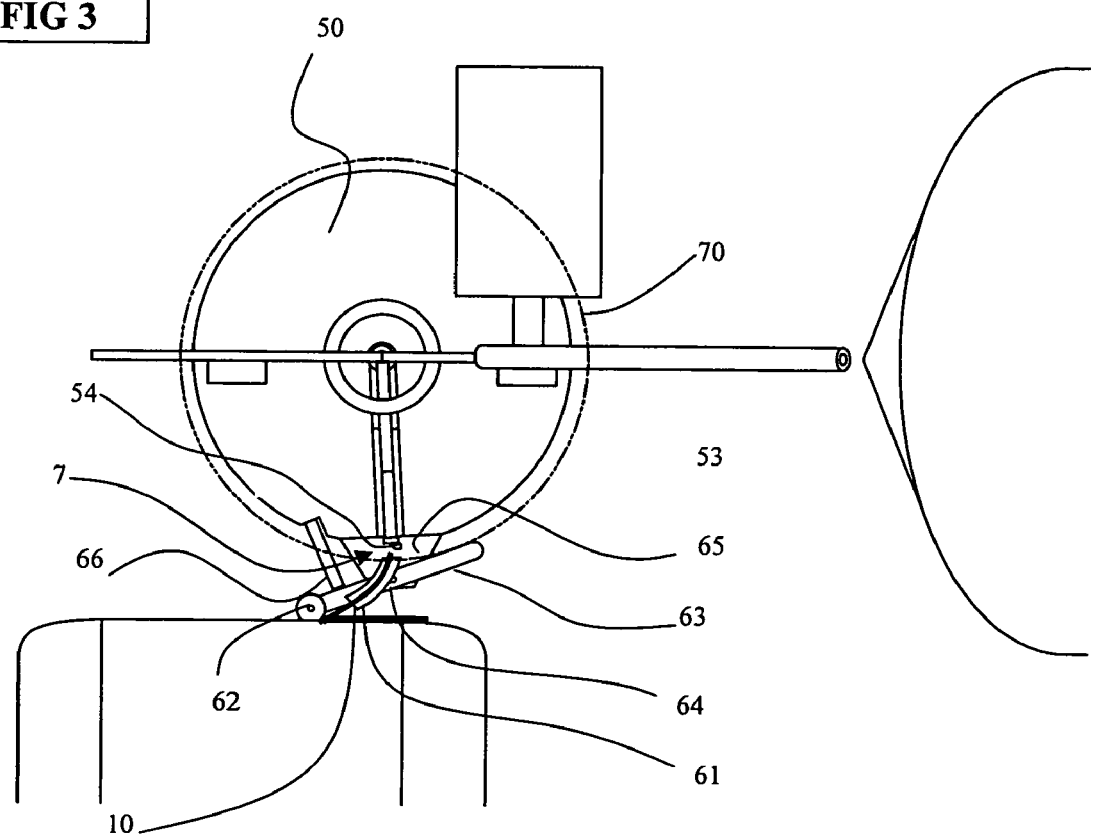

60

7

DEVICE FOR MANUFACTURING A REINFORCEMENT FOR TIRES

FIELD OF THE INVENTION

The present invention concerns the manufacture of tyres. More precisely, it relates to the manufacture of crown reinforcements which are found in tyres with belts and carcasses which are usually radial.

PRIOR ART

Through U.S. Pat. No. 4,952,259, the prior art knows a technique for manufacturing such reinforcements not in the form of semi-finished products referred to as "plies", prepared flat which are subsequently incorporated during the assembly of the tyre, but directly on the tyre in the course of manufacture, and using a single coil of wire. This proposal, which is based on the projection of a wire like the lash of a whip, makes it possible to cover the usual range of angles of the wires of the so-called crown plies; it also makes it possible to manufacture radial carcass reinforcements, or reinforcements of less extensive size. However, for the latter, the smaller the size of the wire, the more problematic it is to implement this technique. The objective of the present invention is to propose a manufacturing technique particularly adapted to producing reinforcements in which the wires are of a relatively modest length, in particular (but not limitingly) for the manufacture of reinforcements in tyre beads or in the radially internal part of the sidewalls, by depositing sections of short lengths adjacently on a support, and this whatever the angle formed by the wire of these reinforcements (an angle of 90° being that of a wire included in a plane comprising the rotation axis of the tyre, according to the conventions well known in this field.

BRIEF DESCRIPTION OF THE INVENTION

The invention proposes a method of manufacturing a reinforcement comprising adjacent sections of reinforcement wire embedded in an elastomer matrix, a method in which:
a reception surface on a support is covered with the said elastomeric matrix;
an assembly comprising a rotary distributor and a member conveying to the distributor is presented in front of the reception surface of the support, the conveying member comprising a final tubular portion substantially perpendicular to the rotation axis of the rotary distributor, the distributor comprising at least one deflector, the deflector forming a corridor to receiving the wire on the radially internal side and forming a guide at the exit from the deflector on the radially external side, a space being provided, in the radial direction, between the rotary distributor and the final tubular portion of the conveying member, the presentation being made so that the reception surface is close to the guidance path at the exit from the deflector when the rotary distributor is rotated, and so that the rotation axis of the rotary distributor forms an angle perpendicular to the deposition angle required for the sections on the support;
the rotary distributor is driven in rotation, at a controlled rotation speed;
the reception surface is made to travel with respect to the rotary distributor;
the wire is introduced, at a controlled linear speed, into the conveying member, threading it into the tubular portion;
a knife is made to act in the space between the tubular portion and the distributor, so that the knife makes it possible to take off a section of wire, the said section being guided as far as and deposited on the reception surface by the said at least one deflector.

A favoured use of the method described above consists of manufacturing a reinforcement during the manufacture of a tyre constructed progressively on the said support, the latter being of revolution and mounted so as to rotate about an axis, stacking the various constituents of the tyre in order and in the place required by the architecture of the said tyre. For example, it is possible to manufacture a reinforcement situated in a sidewall of the tyre, or situated in a bead of the tyre.

More particularly, the invention proposes to apply this method to the manufacture of a reinforcement during the manufacture of a tyre constructed progressively on the said support, this being of revolution and mounted so as to rotate about an axis, stacking the various constituents of the tyre in order and in the place required by the architecture of the said tyre. For example, the support is substantial toroidal in shape, with a shape close to the internal cavity of the tyre.

"Manufacture of a tyre" means a complete manufacture or a partial manufacture, consisting for example of manufacturing a sidewall where at least the reinforcements are manufactured according to the method of the invention.

The term "wire" must of course be understood in an entirely general sense encompassing a single filament, a multi-filament, a cable or a twisted yarn or an equivalent assembly, whatever the material constituting the wire or the treatment which it has undergone, for example a surface treatment for assisting its adhesion to the support or its close connection with the rubber.

When a section of wire is spoken of more specifically, the piece of wire individualised by section is designated more precisely, that is to say a length of wire between two cut ends. It is a case however of a method manufacturing the reinforcement from a single wire, and therefore designed to continuously use the wire supplied for example by a coil, and which produces a reinforcement (a ply in normal terminology).

The support in question may be to the shape of the surface of the internal cavity of the tyre, or close to it. It may be a removable rigid metallic core. However, it could also be a reinforced inflatable membrane such as is found in tyre manufacturing drums. It may also be a core on which a crown block is manufactured. So that the wire placed adheres to the support, it suffices for example for the latter to be coated with a layer of rubber. When a metallic core is used as a support, it is preferable then to vulcanise the tyre on it, in order to facilitate the extraction of the core out of the tyre.

The invention also proposes a device for manufacturing and reinforcement based on sections of reinforcement wire intended to be deposited on a reception surface, the device comprising:
a rotary distributor in rotation about a rotation axis, the rotary distributor comprising at least one deflector, the deflector forming a corridor receiving the wire on the radially internal side and forming a guide at the exit on the radially external side;
a member conveying to the distributor, comprising a final tubular portion substantially perpendicular to the rotation axis of the rotary distributor, a space in the radial direction being provided between the final tubular portion and the rotary distributor;
a knife disposed in the space between the rotary distributor and the conveying member.

The device allows the manufacture of a semi-finished product such as a ply used conventionally in the tyre industry.

However, it is also particularly useful when it is integrated in a tyre manufacturing apparatus, the said apparatus being intended to manufacture a reinforcement formed from a wire delivered continuously and on demand by an appropriate supply, the said apparatus comprising:

frame;

a core of revolution constituting the support on which the said reinforcement is progressively constructed by depositing sections of the said wire;

a device as disclosed above;

a manipulator for presenting to the core of the device, the said structure being mounted on the said member;

means for rotationally driving the central part of the device at a controlled rotation speed;

a member for driving the wire capable of imparting to the wire a linear advance at a controlled speed;

means for driving the core in rotation at a controlled rotation speed.

It should be noted that the rotation axis of the rotary distributor is positioned outside and facing the reception surface on the core.

BRIEF DESCRIPTION OF THE FIGURES

All the details of the embodiment of the invention are explained hereinafter, with the help of the accompanying figures.

The following

DESCRIPTION OF THE BEST EMBODIMENT OF THE INVENTION

Figure 1:
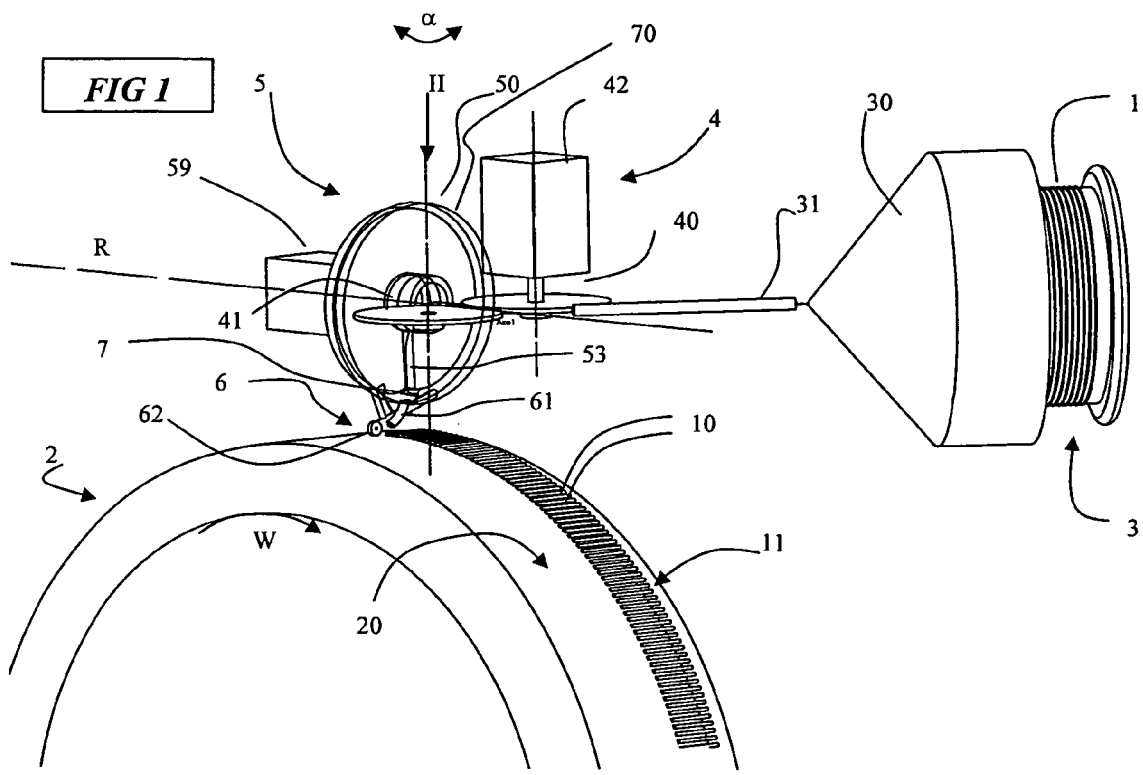
FIG. 1 is a perspective showing the main aspects of the invention.
Figure 2:
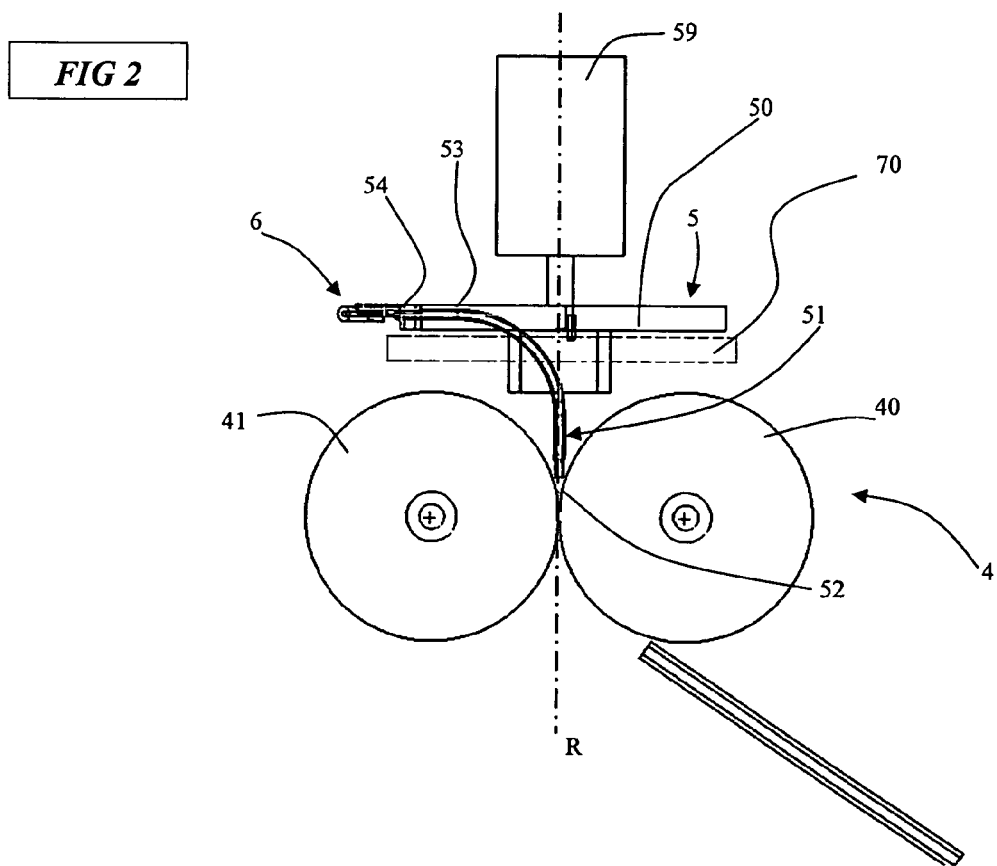
FIG. 2 is another view in elevation in the direction of the arrow II in FIG. 1.

In FIG. 1, a core 2 can be seen intended to define the surface of the internal cavity of a tyre. The core 2 is in particular coated with rubber 20 whose visible surface constitutes a reception surface on which sections 10 of wire 1 are deposited by means of a device according to the invention. The rubber 20 covering the core 2 makes it possible to hold the sections 10 of wire on the core 2 as they are deposited, by adhesive bonding. Together, the sections 10 of wire form a reinforcement 11. The sections 10 of wire form an angle α with respect to the orientation of the reinforcement. It can be seen in FIG. 1 that the general orientation of the reinforcement is here circumferential, that is to say the reinforcement forms an elongate geometric figure whose largest dimension is parallel to a plane perpendicular to the rotation axis of the future tyre. It can also be seen that the angle formed by the sections of wire 10 with respect to the orientation of the reinforcement is approximately 90°. (In fact, the reference with respect to which the angle of each section is measured is the conventional reference according to which the angles are measured in the technical field of the tyre.) Naturally, for more clarity, it should be emphasised lastly that these orientations and angles, in particular the angle of 90° mentioned above, are in no way limiting.

The support illustrating the present invention defines the internal shape for manufacture of the tyre. It is for example a rigid removable core 2 on which a tyre is constructed progressively, without however this being limiting. This support can take many other aspects since the invention also applies for producing semi-finished products used in the manufacture of tyres according to conforming methods. The support can in fact in practice be of any type, for example it may be a conveyor belt.

In FIG. 1 a coil 3 of wire 1 can be seen for supplying the wire placing device. A drive member 4 for the wire 1 can be seen. The wire 1 passes through a kind of funnel 30 before joining a spout 31. This constitutes a wire feed, downstream of which is the drive member 4 for the wire essentially formed by a pair of counter-rotating rollers 40, 41. At least one of the rollers 40, 41 is driven in rotation by a motor 42.

Downstream of the drive member 40, an assembly is found comprising a rotary distributor 6 and a member 5 for conveying to the rotary distributor 6. The latter and the member 5 for conveying to the distributor are arranged so that the functional members are substantially in the same plane perpendicular to the rotation axis of the rotary distributor 6, with a space forming a gap in the radial direction between the two. The gap is provided for inserting a knife 7 between the rotary distributor 6 and the conveying member 5. The conveying member 5 for the wire cooperates with the knife 7 (which can be seen better in FIG. 3), which is mounted on a knife holder 70. In this example embodiment, the conveying member 5 and the distributor 6 are coupled and both rotary, the knife 7 being mounted on a rotary knife holder 70 for purposes of adjustment only and whose rotation can be locked during cutting. It goes without saying however that the conveying member could be made non-rotary and the knife rotary, only their relative rotation having a functional role for taking off sections by cutting the wire, as will be explained in more detail below.

The conveying member 5 comprises various elements mounted, in this example embodiment, on a disc 50 rotating about the rotation axis R. The disc is only one constructional arrangement amongst others. The disc 50 is driven in rotation by a motor 59. Inside the disc 50 there is provided a central tube 51, an inlet orifice 52 of which is disposed substantially on the rotation axis R. The central tube 51 comprises a final tubular portion 53 substantially perpendicular to the rotation axis, the tubular portion 53 being in line with the central tube 51. The final tubular portion 53 comprises, at its radially external end, an orifice 54.

Finally, the rotary distributor 6 is attached to the disc 50. It has been seen that this rotary distributor 6 comprises essentially a deflector for inflecting the path of the wire 1 pushed out of the final tubular portion 53. The deflector forms a corridor for receiving the wire on the radially internal side and forms an exit guidance for the deflector on the radially external side. This deflector consists here of an elbowed tube 61. The rotary distributor 6 is mounted on the disc 50. It therefore turns exactly like the final tubular portion 53. It is mounted so that the elbowed tube 61 is opposite the final tubular portion 53. The said gap is provided, in the radial direction, between the rotary distributor 6 and the final tubular portion 53 of the conveying member 5.

The presentation of the whole is effected so that the reception surface (here the rubber 20 covering the core 2) on which sections of wire will be deposited is close to the path of the wire guided by the deflector at its exit, when the rotary distributor is set in rotation, and so that the rotation axis of the rotary distributor forms an angle perpendicular to the required depositing angle for the sections on the support.

In addition, the rotary distributor 6 also comprises an applicator consisting in this example embodiment of a rotary roller 62. This rotary roller can be replaced by a fixed piece such as of the ski type. The rotary roller 62 is mounted at the end of the arm 63, itself articulated at 64 on a fork joint 65 fixed to the disc 50. A spring 66 (or any device offering a spring function)

tends to move the roller 62 away from the rotor 50. This mechanism comprising a spring can be replaced by a desmodromic control for the position of the rotary roller 62 (or of the substitutive part). It is possible to use for example a control by cam or an electrical actuator controlled by active control.

The knife holder 70 is therefore adjustable for rotation about the rotation axis R in order to adjust the cutting position of the knife 7. The knife 7 is also mounted so as to be interposed in the gap between the tubular portion 53 and the elbowed tube 61, and so as to cooperate with the radial end of the tubular portion 53 in order to execute a clean cut.

The functioning is as follows.

The wire 1 is gripped between the rollers 40, 41 in order to impart a clearly determined forward movement to it. The wire 1 is then introduced into the conveying member 5, through its inlet orifice 52. At each turn of the disc 50, the wire is presented to the knife 7 immobile in space. Therefore, at each turn of the disc 50 and since the knife 7 is immobile in space, the wire is cut and a section 10 is released. At the moment when the knife 7 cuts the wire, the latter is immobilized for a very brief moment. It is therefore necessary for this central tube to be able to momentarily contain the quantity of wire which continues to be propelled by the rollers 40, 41.

If the conveying member 5 is in rotation whilst the drive member 4 is immobile, at the first turn of the disc 50, the wire is cut flush with the orifice 50 and then nothing further occurs. As soon as a certain advance is imposed on the wire 1 by appropriately controlling the rotation of the rollers 40, 41, at each turn of the disc 50 a certain length of wire 1 will emerge beyond the orifice 54. This certain length determines the length of the sections 10. At each turn of the disc 50, a section 10 is released.

Each section 10 is guided by the elbowed tube 61 as far as the reception surface on which it is thus deposited. The elbowed tube 61 makes it possible to receive the sections 10 of wire as the wire is cut by the knife 7.

Through the elbowed shape of the elbowed tube 61, the orientation taken by the wire 1 is progressively changed from a radial orientation with respect to the rotation axis R into an orientation substantially perpendicular to the said radial orientation, before being deposited on the surface of the core 2. Naturally the core 2 is itself driven in rotation by any suitable device, not shown, in the direction indicated by the arrow W.

A description will now be given in more detail of the cycle of creating a section 10 as from the moment when the orifice 54 has just passed the knife 7, which is the position illustrated in FIG. 1, 3 or 3bis. Just before this moment, the free end of the wire 1 has begun to emerge from the orifice 54 and has entered the elbowed tube 61. During the rotation of the disc, the wire 1 continues to emerge. FIG. 4 can be consulted. During the continuation of the rotation of the disc, the wire 1 takes an attitude imposed by the form of the peripheral tube.

Figure 5:
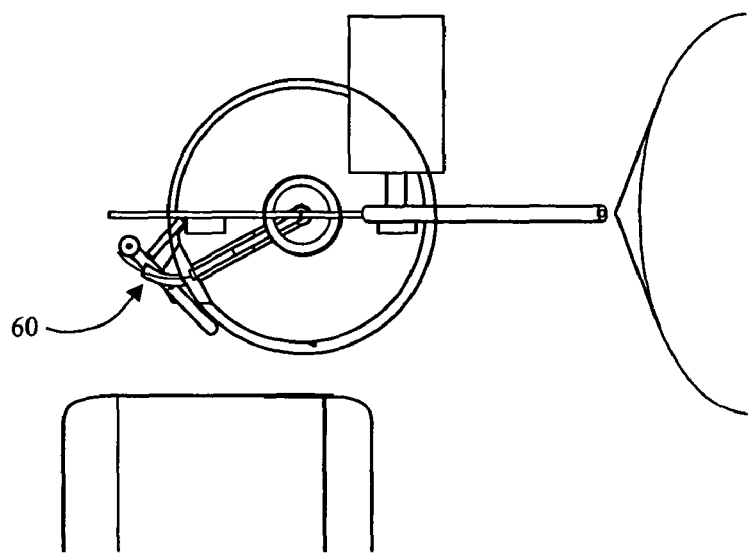
Figure 6:
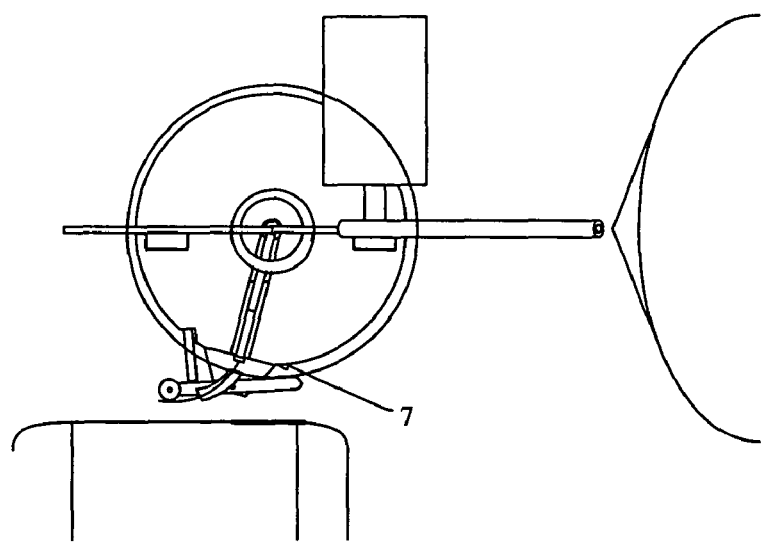
Figure 7:
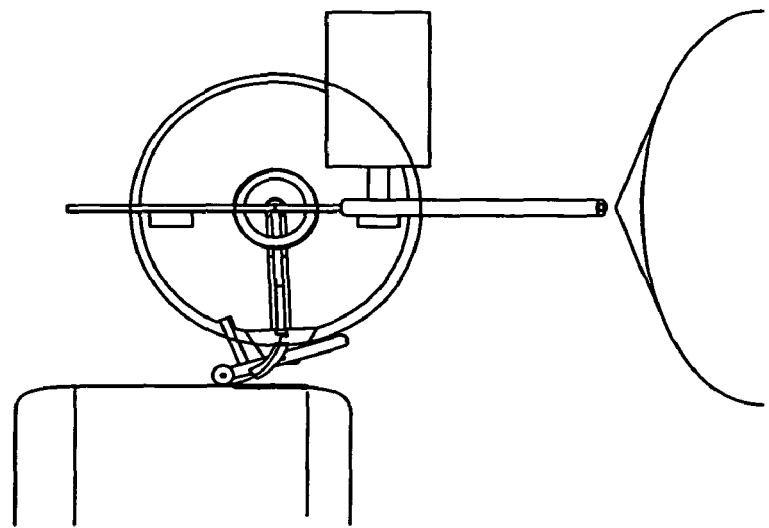

FIG. 5 can be consulted. In FIG. 6, the disc has performed a complete rotation and the distributor 6 has reached a deposit location along its travel path wherein it approaches the knife 7. It can be seen that, before being cut, the free end of the wire 1 has joined the surface of the core 2 and is gripped between the roller 63 and the core 2. FIG. 7 differs from FIG. 6 only through a few degrees of angle of the disc 50, whose movement has continued to make the orifice 54 move forwards quite close to the knife 7. In FIG. 7, the wire strikes the knife 7, which cuts it, and the cycle recommences.

Figure 3A:
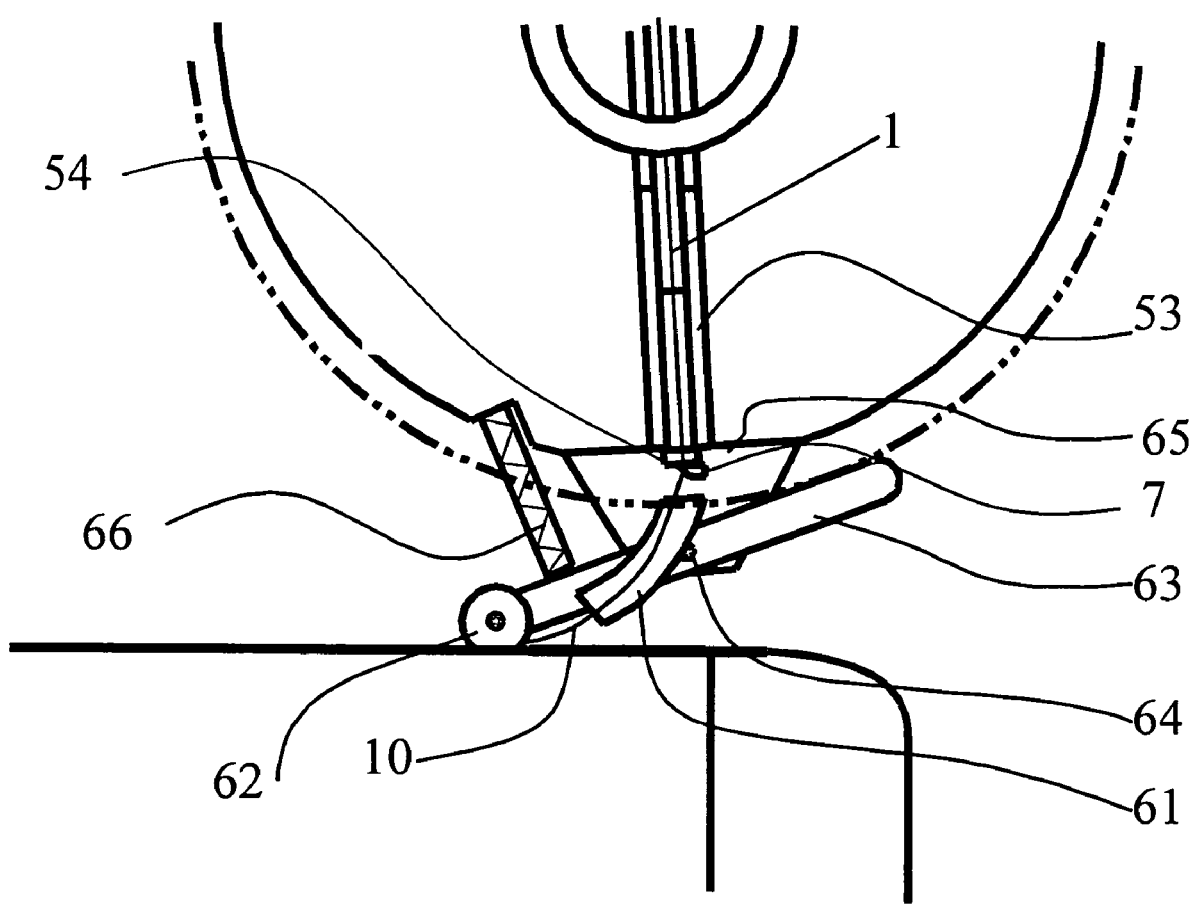
FIGS. 3 to 7 show various successive stages of the functioning of the invention.
Figure 4:
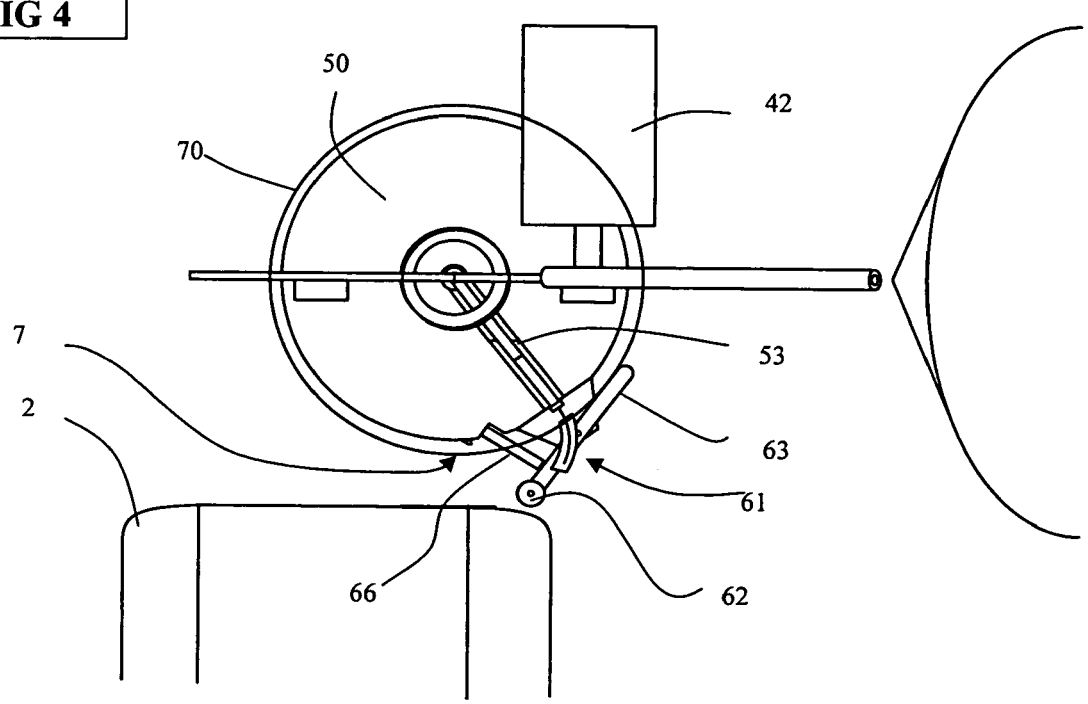

In FIG. 3 or on the zoom on the part adjacent to the support constituted by FIG. 3bis, it can be seen that the cut wire now forms a section 10 which continues to be applied to the core 2 by the roller 62. FIG. 1 shows many sections 10 applied to the core 2.

The various characteristics of the reinforcement manufactured by means of the device according to the invention are the length of the sections and the deposition angle of the sections with respect to the main direction of the reinforcement. The length of each section 10 is adjusted by appropriately adapting the relative speed of the drive member 4 (which adjusts the linear speed imparted to the wire) with respect to the speed of rotation of the conveying member 5. For a given speed of rotation of the conveying member 5, the greater the speed of rotation of the rollers 40, 41, the greater the length of the sections 10 and vice versa.

As for the orientation of the sections 10, this is adjusted by acting on the angle α (see FIG. 1) of presentation of the depositing device itself with respect to the movement of the surface on which the sections of wire are deposited. If the movement of the deposition surface is oriented perpendicular to the plane of the disc 50, as is the case in the example illustrating the invention, the sections 10 form an angle of 90° with respect to the general direction of the reinforcement. If the direction of advancement of the core 2 forms an angle of less than 90° with respect to the plane of the disc 50, the result shown in FIG. 1 is obtained.

The invention claimed is:

1. A method of manufacturing a reinforcement comprised of adjacent sections of reinforcement wire embedded in an elastomer matrix, the method comprising the steps of:
   A. positioning, in front of an elastomeric covering of a surface-of-revolution reception surface of a support, an assembly comprising a rotary distributor and a rotary conveying member arranged to rotate about a common rotation axis located outwardly of the support, the conveying member arranged to convey a reinforcement wire to the distributor and including a tubular portion oriented substantially radially with respect to the rotation axis and disposed radially inwardly relative to the distributor, the distributor including a deflector comprised of an elbowed tube forming a corridor having a wire inlet and a wire outlet spaced farther from the rotation axis than the wire inlet, the wire inlet spaced from a wire exit orifice of the conveying member to form a gap therebetween, the rotation axis arranged such that during rotation of the distributor the wire outlet repeatedly reaches a deposit location of its travel path and passes across the elastomeric covering;
   B. driving the assembly by a motor such that the distributor and the conveying member are rotated together about the rotation axis by the motor at a controlled speed,
   C. feeding the wire at a controlled speed through the tubular portion and the corridor during step B;
   D. cutting the wire at the gap with a knife as the wire outlet reaches the deposit location so that a section of the wire disposed in the corridor exits the corridor through the wire outlet and is deposited onto a portion of the elastomeric covering; and
   E. moving the elastomeric covering relative to the assembly to present a new portion of the elastomeric covering at the deposit location, to receive another wire section.

2. Method according to claim 1, in which the rotation axis of the rotary distributor is disposed outwardly of the support.

3. Method according to claim 1, in which the conveying member and the distributor are coupled and both rotary, the knife being kept immobile during the cutting step.

4. Method according to claim 3, in which the knife cuts the wire once per revolution of the rotary distributor.

5. Method according to claim 1, used for manufacturing a reinforcement during the manufacture of a tyre constructed progressively on the support, the support being mounted to rotate about an axis, stacking the various constituents of the tyre in order and in the place required by the architecture of the tyre.

6. Method according to claim 5, used for manufacturing a reinforcement situated in a sidewall of the tyre.

7. Method according to claim 5, used for manufacturing a reinforcement situated in a bead of the tyre.

8. Method according to claim 5, in which the support is substantially toroidal in form, with a shape similar to an internal cavity of the tyre.

9. Method according to claim 1, wherein the length of the sections is adjusted by appropriately adapting the linear speed imparted to the wire.

10. Method according to claim 1, wherein the rotation axis is spaced above the elastomeric covering.

11. A device for forming sections of reinforcing wire suitable for being deposited on a reception surface, comprising:
 a rotary distributor mounted for rotation about a rotation axis and comprising a deflector, the deflector comprised of an elbowed tube forming a wire corridor having a wire inlet and a wire outlet spaced farther from the rotation axis than the wire inlet, wherein the wire outlet is directed to discharge wire;
 a rotary wire conveying member disposed radially inwardly of the distributor and mounted for rotation about the rotation axis together with the distributor, the conveying member including a final tubular portion arranged substantially perpendicular to the rotation axis and positioned to convey a wire from an exit orifice of the final tubular portion and into the wire inlet, the exit orifice being spaced from the inlet and to form a gap therebetween;
 a motor for rotating the distributor and the conveying member together about the rotation axis as wire is fed through the tubular portion and the corridor; and
 a knife disposed in the gap for periodically cutting the wire to form a wire section disposed in the corridor.

12. Device according to claim 11, in which the conveying member and the distributor are coupled together, the knife being mounted on a rotary knife holder for purposes of adjustment, and whose rotation can be locked during cutting of the wire.

13. Device according to claim 11, in which the rotary conveying member comprises a central tube, an inlet orifice of which is disposed substantially on the rotation axis.

14. Device according to claim 13, further including a disc mounted for rotation about the rotation axis and in which the central tube is provided to rotate about the rotation axis.

15. Device according to claim 11, comprising an applicator fixed to the rotary distributor.

16. Device according to claim 15, in which the applicator is mounted at the end of an arm which is articulated on a fork joint fixed to the rotary distributor.

17. Device according to claim 15, in which the applicator is a rotary roller.

18. Device according to claim 15, in which a spring tends to move the applicator away from the rotary conveying member.

19. Device according to claim 11, wherein the rotation axis is spaced above the elastomeric covering.

* * * * *